United States Patent
Yamagata et al.

(12) 
(10) Patent No.: US 12,463,492 B1
(45) Date of Patent: Nov. 4, 2025

(54) HOUSING, MOTOR, AND BLOWER

(71) Applicant: MABUCHI MOTOR CO., LTD., Chiba (JP)

(72) Inventors: Yasuhiro Yamagata, Chiba (JP); Akiko Saito, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 0 days.

(21) Appl. No.: 19/115,250

(22) PCT Filed: Jul. 23, 2024

(86) PCT No.: PCT/JP2024/026373
§ 371 (c)(1),
(2) Date: Mar. 26, 2025

(87) PCT Pub. No.: WO2024/176758
PCT Pub. Date: Aug. 29, 2024

(51) Int. Cl.
| H02K 3/52 | (2006.01) |
| F04D 25/06 | (2006.01) |
| H02K 5/22 | (2006.01) |
| H02K 7/04 | (2006.01) |
| H02K 21/16 | (2006.01) |

(52) U.S. Cl.
CPC ............ *H02K 3/522* (2013.01); *F04D 25/06* (2013.01); *H02K 5/22* (2013.01); *H02K 7/04* (2013.01); *H02K 21/16* (2013.01); *H02K 2203/06* (2013.01)

(58) Field of Classification Search
CPC ............ H02K 3/28; H02K 5/22; H02K 15/33
USPC .................................................. 310/179, 418
See application file for complete search history.

(56) References Cited

U.S. PATENT DOCUMENTS

| 9,166,452 B1 | 10/2015 | Endo et al. |
| 10,784,733 B2 * | 9/2020 | Shimokawa ........... H02K 1/278 |
| 11,563,349 B2 * | 1/2023 | Hong ..................... H02K 3/522 |

FOREIGN PATENT DOCUMENTS

| CN | 105281532 A | 1/2016 |
| JP | H05-308738 A | 11/1993 |
| JP | H07-203649 A | 8/1995 |

(Continued)

OTHER PUBLICATIONS

WO-2014061359-A1 machine translation (Year: 2014).*

(Continued)

*Primary Examiner* — Oluseye Iwarere
*Assistant Examiner* — Minki Chang
(74) *Attorney, Agent, or Firm* — HAUPTMAN HAM, LLP

(57) ABSTRACT

A housing that accommodates a stator of a motor includes: an opening portion configured to accommodate the stator; an outer edge portion formed radially outward of the opening portion and in a circumferential direction in such a manner as to surround an outer periphery of the stator, the outer edge portion extending in a radial direction; and an accommodating groove configured to accommodate a solder portion where conductive wires including a winding of the stator are soldered and which is drawn out to the outer edge portion. The accommodating groove is placed in the outer edge portion, and is extended in any direction between a normal direction to the outer periphery at a circumferential position where the accommodating groove is placed and a tangential direction to the outer periphery at the circumferential position.

6 Claims, 5 Drawing Sheets

(56) References Cited

FOREIGN PATENT DOCUMENTS

JP      2018-088782 A    6/2018
WO      WO-2014061359 A1 *  4/2014   ............. F04D 13/06

OTHER PUBLICATIONS

International Search Report in PCT Application No. PCT/JP2024/026373 mailed Oct. 1, 2024, 5pp.
Written Opinion in PCT Application No. PCT/JP2024/026373 mailed Oct. 1, 2024, 6pp.

* cited by examiner

HOUSING, MOTOR, AND BLOWER

CROSS-REFERENCE TO RELATED APPLICATIONS

This application is a national stage entry according to 35 U.S.C. 371 of PCT Application No. PCT/JP2024/026373 filed on Jul. 23, 2024.

TECHNICAL FIELD

The present invention relates to a housing that accommodates a stator of a motor, a motor including a stator accommodated in the housing, and a blower to which the motor is applied.

BACKGROUND ART

Structures have been proposed in which end portions of conductive wires such as windings forming coils and leads for supplying power to the windings are placed in a housing that accommodates a stator of a motor in such a manner as not to interfere with other members. For example, Patent Literature 1 discloses a structure in which in a brushless motor, stator windings are wound around a stator core via an insulating layer, one end of the stator winding configuring each phase is directly connected together in such a manner as to be at the same potential and creates a neutral connection, and, for example, a fastener and a hole for placing the neutral connection is provided in a part of the insulating layer. In the technology of Patent Literature 1, the neutral connection is inserted into the fastener and the hole and fixed with an adhesive or a protrusion.

CITATION LIST

Patent Literature

Patent Literature 1: JP-A-5-308738

DISCLOSURE OF THE INVENTION

Problems to be Solved by the Invention

However, in the technology of fixing and placing a neutral connection with, for example, an adhesive as in Patent Literature 1 described above, an external force is likely to be applied to the neutral connection spot during the fixing operation, and therefore, the neutral connection may be deformed. In particular, if the neutral connection is soldered, when the solder portion is deformed by an external force during the fixing operation, it leads to a reduction in quality of connection. Note that not only the neutral connection in which one ends of windings are connected together but also a structure in which a portion where a connected spot of a winding and a lead, or a connected spot of leads, is soldered (hereinafter referred to as a "solder portion") is placed may have a problem similar to the above. Therefore, the housing that accommodates the stator has room for improvement in a placement structure that can prevent the deformation of the solder portion where the conductive wires including the winding are soldered.

A housing, motor, and blower according to the present invention have been devised in view of such a problem, and one of objects thereof is to prevent deformation of a solder portion and to secure quality of connection. Note that the present invention is not limited to this object, but also has another object of exerting operations and effects that are derived by configurations presented in DESCRIPTION OF PREFERRED EMBODIMENTS described below, the operations and effects being unobtainable by the known technology.

Solutions to the Problems

A housing, motor, and blower according to the disclosure can be achieved as aspects (application examples) disclosed below, and solve at least a part of the above problem. Any of Aspects 2 to 4 is an aspect that can be additionally selected as appropriate, and is an aspect that can be omitted. Any of Aspects 2 to 4 does not disclose an aspect and configuration that are essential to the present invention.

Aspect 1. A housing according to the disclosure is a housing that accommodates a stator of a motor, the housing including: an opening portion configured to accommodate the stator: an outer edge portion formed radially outward of the opening portion and in a circumferential direction in such a manner as to surround an outer periphery of the stator, the outer edge portion extending in a radial direction; and an accommodating groove configured to accommodate a solder portion where conductive wires including a winding of the stator are soldered and which is drawn out to the outer edge portion, in which the accommodating groove is placed in the outer edge portion, and is extended in any direction between a normal direction to the outer periphery at a circumferential position where the accommodating groove is placed and a tangential direction to the outer periphery at the circumferential position.

Aspect 2. In the above Aspect 1, it is preferable that a length of the outer edge portion in the radial direction be set to be shorter than a length of the solder portion in a longitudinal direction thereof, and that the accommodating groove be extended in a direction intersecting with the normal direction.

Aspect 3. In the above Aspect 1 or 2, it is preferable that the accommodating groove be extended in a direction intersecting with both of the normal direction and the tangential direction.

Aspect 4. In any of the above Aspects 1 to 3, it is preferable that the accommodating groove accommodate the solder portion that is not fixed but is simply placed therein.

Aspect 5. A motor according to the disclosure includes: the housing according to any of the above Aspects 1 to 4; a stator accommodated in the housing; and a rotor placed, facing the stator in a radial direction.

Aspect 6. A blower according to the disclosure includes: the motor according to the above Aspect 5; and an impeller fixed to a rotary shaft of the motor.

Effects of the Invention

According to the housing, motor, and blower according to the disclosure, the solder portion where the conductive wires including the winding are soldered is accommodated in the accommodating groove placed in the outer edge portion. Therefore, the deformation of the solder portion drawn out to the outer edge portion can be prevented.

DESCRIPTION OF PREFERRED EMBODIMENTS

A housing, a motor, and a blower as an embodiment are described with reference to the drawings. The embodiment presented below is a mere exemplification. There is no intention to preclude various modifications and application of a technology, which are not explicitly stated in the embodiment below. The configurations of the embodiment can be modified and carried out in various manners within the scope that does not depart from the purport of the configurations. Moreover, a selection can be made from the configurations as needed, or the configurations can be combined as appropriate.

In the embodiment, a housing for accommodating a stator of a motor used for a blower is described as an example of the housing.

In the following description, a direction where a rotary shaft of the motor extends (a rotary shaft direction) is defined as an axial direction/axial, and a direction that is orthogonal to the axial direction and is away from the rotary shaft and a direction toward the rotary shaft are defined as a radial direction/radially. Moreover, in the radial direction, the rotary shaft side is defined as a radially inner side/radially inward, and the opposite side (a side away from the rotary shaft) is defined as a radially outer side/radially outward. A direction that is orthogonal to the axial direction and is around the rotary shaft is defined as a circumferential direction.

[1. Configuration]

Figure 1:
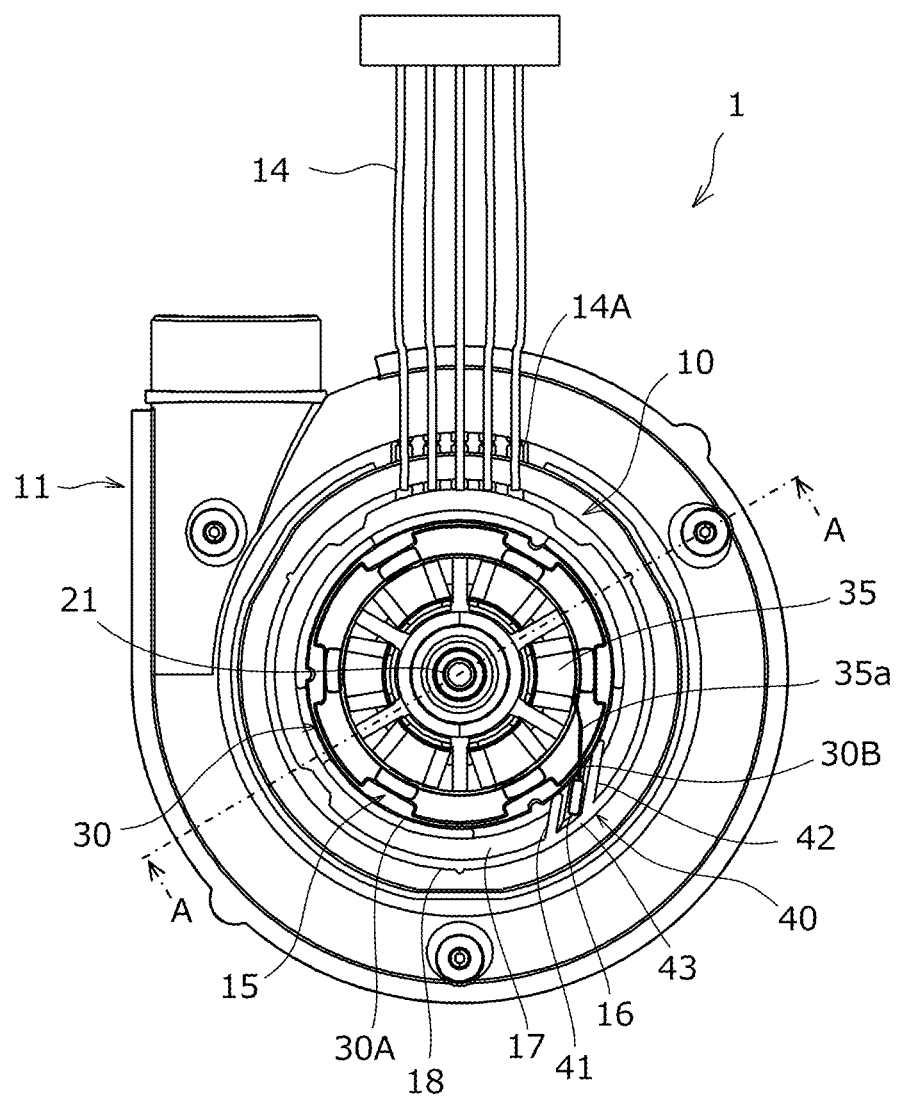
FIG. 1 is a plan view for explaining a blower according to an embodiment.
Figure 2:
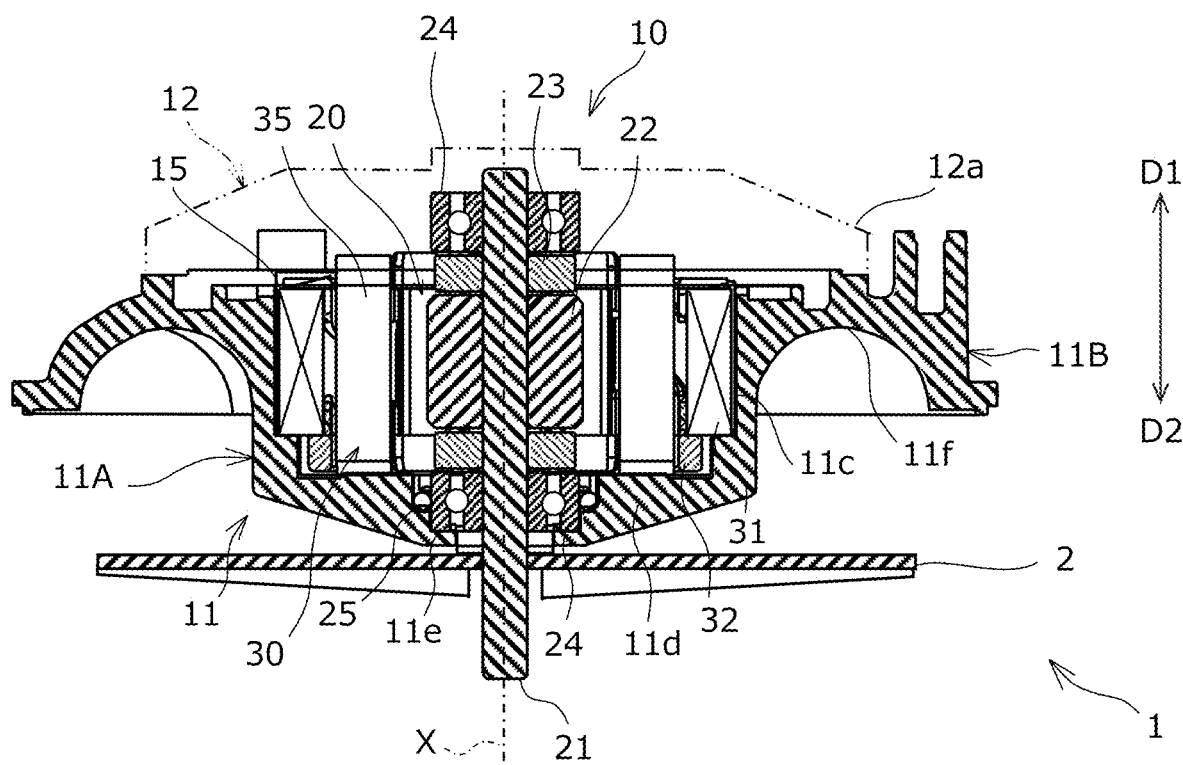
FIG. 2 is a cross-sectional view on arrows A-A of FIG. 1.

FIG. 1 is a plan view for explaining the configuration of a blower 1 according to the embodiment, and omits an end bell 12 (refer to FIG. 2) from the illustration to have an understanding of the internal structure. FIG. 2 is a cross-sectional view on arrows A-A of FIG. 1. The blower 1 of the embodiment is a blower that sends gas (for example, air) by rotation of an impeller 2 (refer to FIG. 2).

As illustrated in FIGS. 1 and 2, the blower 1 includes the impeller 2, a motor 10 as a driving source of the impeller 2, and a blower housing 11 (hereinafter simply referred to as the "housing 11") forming a case body that accommodates the impeller 2 and the motor 10. The motor 10 of the embodiment is an inner rotor brushless motor, and includes a shaft 21 (a rotary shaft) having a rotation center X, a rotor 20 that rotates integrally with the shaft 21, and a stator 30 located radially outward (hereinafter also simply referred to as "outward/outer side") of the rotor 20. The stator 30 is accommodated in the housing 11, and the rotor 20 is placed, facing the stator 30 in the radial direction (radially inward in the embodiment).

As illustrated in FIG. 2, the rotor 20 includes a magnet 22 fixed to the shaft 21 and two balancers 23 that sandwich the magnet 22 in the axial direction, and is fixed by a bearing 24 in such a manner as to be rotatable relative to the housing 11 and the end bell 12. The stator 30 includes a stator core 31 fixed to an inner peripheral surface of the housing 11, and coils 35 wound around the stator core 31 via an insulator 32.

In the embodiment, as illustrated in FIG. 1, the stator 30 including six coils 35 spaced at even intervals in the circumferential direction is taken as an example. The six coils 35 of the stator 30 are formed by winding windings 35a by, for example, a wye connection method. Specifically, each of the six coils 35 configures one of phase U, phase V, or phase W, and each pair of the coils 35 configuring the same phase is connected by a crossover wire (not illustrated).

Leads 14 for supplying power to the windings 35a forming the coils 35 are connected by soldering to end portions (for example, start wires) of the windings 35a. Moreover, an end portion (hereinafter referred to as an "end wire") of the winding 35a of the coil 35 of each phase on the side to which the lead 14 is not connected forms a neutral point coupled together, and the end portions (end wires) of these windings 35a are connected by soldering.

In the description, a portion in which conductive wires including the winding 35a of the stator 30 are soldered is referred to as a "solder portion." Note that both of the winding 35a and the lead 14 are elements included in "conductive wires" in the claims.

In the following description, a solder portion 16 in which the end wires of the coils 35 of the respective phases are soldered is described as an example of the "solder portion". The solder portion 16 is a part where the end portions of a plurality of the windings 35a are bundled and soldered, and therefore, is formed in a shape extending along a direction where in the solder portion 16 the windings 35a extend (a longitudinal direction), for example, an approximately cylindrical shape or an approximately ellipsoidal shape. Note that in reality the solder portion 16 is not necessarily formed in a beautiful shape such as an approximately cylindrical shape or an approximately ellipsoidal shape, but is formed in a shape in which at least the direction where the windings 35a extend is the longitudinal direction.

Moreover, groove portions 14A are formed on an upper surface side of the housing 11 to allow a plurality of (five, here) the leads 14 to be drawn out from inside the housing 11 and the end bell 12, respectively. The number of the groove portions 14A and the number of the leads 14 are the same, and it is configured in such a manner that the leads 14 can be appropriately routed outward from inside the housing 11 by placing the leads 14 in the groove portions 14A respectively. In the embodiment, three of the five leads 14 are connected to the windings 35a, and the remaining two are connected to, for example, an electronic device other than the windings 35a, such as a temperature sensor. Note that the number of the leads 14 and the connection target are not limited to the above.

As illustrated in FIG. 2, the impeller 2 is fixed to one end portion of the shaft 21. The impeller 2 is an impeller for blowing air, and is configured, including, for example, a disk-shaped base portion fixed to the shaft 21 and a plurality of fins provided radially and erected on a surface of the base portion. When the motor 10 operates and the shaft 21 rotates, then the impeller 2 rotates integrally with the shaft 21.

The housing 11 includes a bottomed cylindrical portion 11A and an annular portion 11B as parts for accommodating the impeller 2 and the motor 10. The cylindrical portion 11A is a part that forms a placement space for the motor 10 (that is, the rotor 20 and the stator 30) therein, and the annular portion 11B is a part that forms a placement space for the impeller 2 on the outer side of the cylindrical portion 11A and between the annular portion 11B and an unillustrated cover member. The annular portion 11B is formed continuously outward from an outer peripheral surface of a side wall portion 11c of the cylindrical portion 11A. An upper end portion of the annular portion 11B functions as a flange portion 11f extending outward from the side wall portion 11c.

Moreover, in the housing 11 of the embodiment, a bottom portion 11d of the cylindrical portion 11A is provided with a through-hole through which the shaft 21 is inserted and a stepped portion 11e to which the bearing 24 and an O-ring 25 are fixed. A lower end portion of the shaft 21 protrudes through a lower surface side of the housing 11 from the through-hole, and the impeller 2 is fixed to the lower end portion. The cover member is mounted on the lower surface side of the housing 11.

In the embodiment, the case body of the blower 1 is formed by assembling the end bell 12 and the cover member with the housing 11. Put another way, the housing 11 is one of components making up the case body. The case body has an approximately circular appearance as viewed in the axial direction, and the impeller 2 and the motor 10 are placed (accommodated) in the case body. The dimensions of the case body of the blower 1 are set in such a manner that at least the impeller 2 and the motor 10 can be integrated therein. The end bell 12 is a lid member that is assembled with the housing 11. In the embodiment, an outer peripheral end portion 12a of the end bell 12 is placed on the flange portion 11f of the housing 11, and the end bell 12 is fixed to the housing 11.

The interior of the above cylindrical portion 11A, that is, a space surrounded by the side wall portion 11c and the bottom portion 11d is the placement space for the rotor 20 and the stator 30. Hereinafter, for convenience, in the axial direction, a side on which the end bell 12 is placed on the housing 11 is referred to as a "first direction D1," and the opposite side is referred to as a "second direction D2." Moreover, assuming that the axial direction is an up-and-down direction, the first direction D1 side is referred to as "up/upper," and the second direction D2 side is referred to as "down/lower."

As illustrated in FIGS. 1 and 2, the housing 11 includes an opening portion 15 for accommodating the stator 30. The opening portion 15 is used to accommodate the stator 30 in the axial direction. The opening portion 15 is a part surrounded by an upper edge of the side wall portion 11c at an upper end of the cylindrical portion 11A, and forms an opening through which the rotor 20 and the stator 30 are placed in the cylindrical portion 11A.

The opening portion 15 has an approximately circular outline as viewed in the first direction D1. Note that the approximately circular shape is not limited to a perfect circle (circular shape) but includes a shape that can be regarded as a circular shape. For example, the opening portion 15 may have a polygonal shape that can be regarded as a circular shape as viewed in the first direction D1. The opening portion 15 of the cylindrical portion 11A is covered with the end bell 12 as schematically indicated by chain double-dashed lines in FIG. 2.

Figure 3:
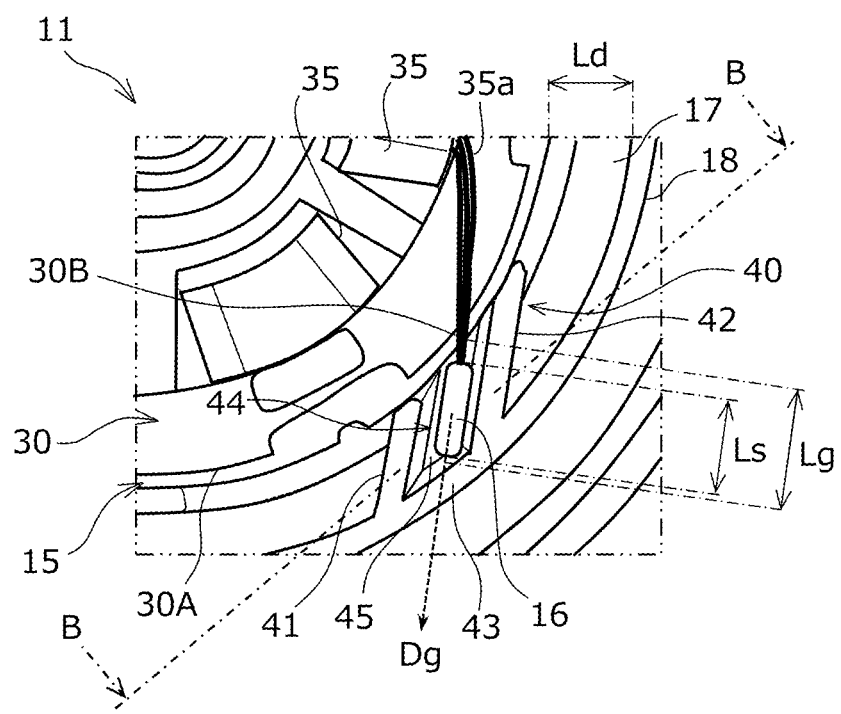
FIG. 3 is an enlarged view of the main features of a housing of FIG. 1.

FIG. 3 is an enlarged view of the main features of the housing 11. As illustrated in FIGS. 1 and 3, the housing 11 is provided with an outer edge portion 17 formed radially outward of the opening portion 15 and in the circumferential direction in such a manner as to surround an outer periphery 30A of the stator 30 and extending in the radial direction, and an accommodating groove 40 that accommodates the solder portion 16 drawn out to the outer edge portion 17.

The outer edge portion 17 is an annular part in a flat form formed radially outward from the upper edge of the side wall portion 11c as viewed in the first direction D1. The flat outer edge portion 17 forms a region where the solder portion 16 drawn radially outward from the stator 30 side is placed. The accommodating groove 40 is placed in the outer edge portion 17, and is a groove-shaped part for placing the solder portion 16 drawn out to the outer edge portion 17 in such a manner as to prevent deformation. Specifically, the accommodating groove 40 is configured in such a manner that the solder portion 16 is placed in such a manner as not to interfere with other members such as the stator 30 and the windings 35a, that is, the solder portion 16 is not in physical contact with and is electrically insulated from other members.

Note that "the solder portion 16 is accommodated" means that at least a part of the solder portion 16 stays in the accommodating groove 40. However, for example, if a conductor is placed around the solder portion 16 and it is desired to avoid contact between the solder portion 16 and the conductor, it is also possible to prevent any part of the solder portion 16 from being exposed to the outside of the accommodating groove 40. Note that each of the windings 35a is covered with an insulating material except for a portion to be the solder portion 16; therefore, electrical insulation can be secured as long as at least the solder portion 16 is accommodated in the accommodating groove 40 (put another way, even if the covered windings 35a that are not soldered are exposed to the outside of the accommodating groove 40).

In the housing 11 of the embodiment, one accommodating groove 40 is provided for one solder portion 16. As illustrated in FIGS. 1 and 3, a position where in the outer edge portion 17 the accommodating groove 40 is placed may be set according to a position where the solder portion 16 is drawn out from the stator 30 side, as appropriate, and it is preferable that a distance from the position where the solder portion 16 is drawn out from the stator 30 side to the accommodating groove 40 be set to be the shortest. The position of the accommodating groove 40 may be determined according to the specification of the coils 35 (that is, the placement of the winding 35a of each phase).

As illustrated in FIGS. 1 and 3, the accommodating groove 40 is extended in any direction Dg between a normal direction Dn (refer to FIG. 4) to the outer periphery 30A at a position (circumferential position) 30B where the accommodating groove 40 is placed and a tangential direction Dt (refer to FIG. 4) to the outer periphery 30A at the position 30B. Specifically, the accommodating groove 40 is a part extended linearly in the above direction Dg from the position 30B where the accommodating groove 40 is placed on the outer periphery 30A. Hereinafter, the direction where the accommodating groove 40 extends is also referred to as the "extending direction Dg."

Figure 4:
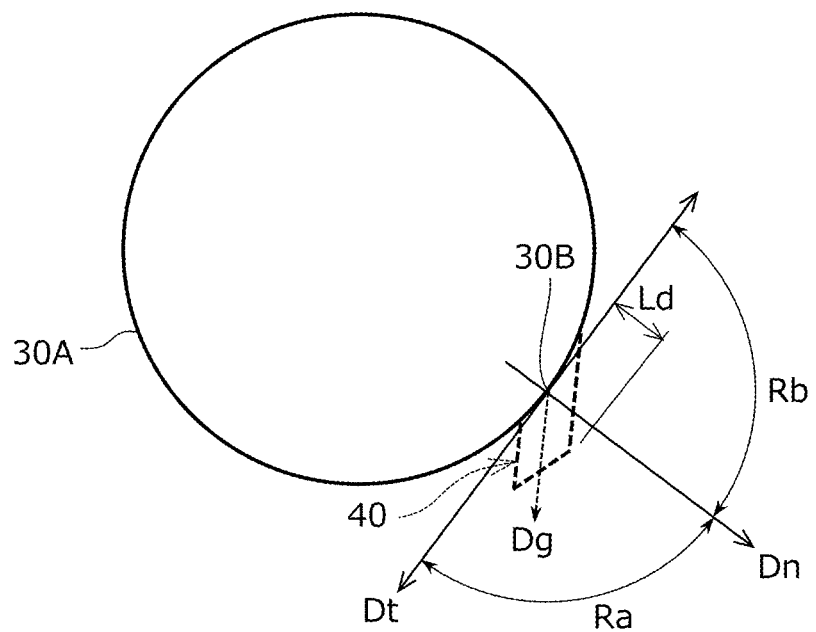
FIG. 4 is a schematic diagram for explaining an extending direction of an accommodating groove.

FIG. 4 is a schematic diagram for explaining the extending direction Dg of the accommodating groove 40. A circle in FIG. 4 indicates the outer periphery 30A of the stator 30. The position 30B on the outer periphery 30A is the position where the accommodating groove 40 is placed (the position of a radially inner end portion of the accommodating groove 40). Moreover, in FIG. 4, the accommodating groove 40 in the housing 11 of FIG. 1 is schematically indicated by broken lines. The normal direction Dn to the outer periphery 30A is a direction where a virtual normal line passing through the position 30B on the outer periphery 30A extends, and agrees with the radial direction of the circle (the stator 30). Moreover, the tangential direction Dt to the outer periphery 30A is a direction where a virtual tangent passing through the position 30B on the outer periphery 30A extends. The normal direction Dn can also be said to be a direction intersecting perpendicularly with the tangential direction Dt in a plane where the outer periphery 30A extends.

The extending direction Dg of the accommodating groove 40, that is, the any direction Dg between the normal direction Dn and the tangential direction Dt is any direction within a region between an angle range Ra of approximately 90° from the normal direction Dn at the position 30B to the tangential direction Dt extending in one direction from the position 30B and an angle range Rb of approximately 90° from the normal direction Dn at the position 30B to the tangential direction Dt extending in the other direction from the position 30B (that is, within 180° from the one tangential direction Dt to the other tangential direction Dt).

Incidentally, as illustrated in FIG. 3, a length Lg of the accommodating groove 40 in the extending direction Dg is defined by a length Ld of the outer edge portion 17 in the radial direction (a dimension in which the outer edge portion 17 extends in the radial direction) and the extending direction Dg of the accommodating groove 40. It is preferable that the length Lg of the accommodating groove 40 be set to be longer than at least the solder portion 16 from the viewpoint of securing the accommodation performance that can accommodate the solder portion 16 without deformation. Meanwhile, the length Ld (refer to FIGS. 3 and 4) of the outer edge portion 17 in the radial direction is desirably set as short as possible from the viewpoint of making the housing 11 compact.

Therefore, in order to set the length Ld of the outer edge portion 17 in the radial direction as short as possible and set the length Lg of the accommodating groove 40 as long as possible, the length Ld of the outer edge portion 17 in the radial direction is set to be shorter than a length Ls of the solder portion 16 in its longitudinal direction, and the accommodating groove 40 is extended in a direction intersecting with the normal direction Dn. In this manner, the accommodating groove 40 is provided, inclined toward the tangential direction Dt relative to the normal direction Dn (that is, the extending direction Dg does not agree with the normal direction Dn); therefore, the length Lg of the accommodating groove 40 in the extending direction Dg can be set to be longer than the length Ld of the outer edge portion 17 in the radial direction. Put another way, even if the length Ld of the outer edge portion 17 in the radial direction is set to be shorter than the length Ls of the solder portion 16, the length Lg of the accommodating groove 40 can be set to be shorter than the length Ls of the solder portion 16.

Moreover, the accommodating groove 40 of the embodiment is extended in a direction intersecting with both of the normal direction Dn and the tangential direction Dt side from the viewpoint of securing the accommodation performance that can accommodate the solder portions 16 without deformation. In other words, as illustrated in FIG. 4, the extending direction Dg of the accommodating groove 40 is set in such a manner as to agree with neither the normal direction Dn nor the tangential direction Dt.

The solder portion 16 is drawn out to the outer edge portion 17 in an attitude extending in the direction intersecting with both of the normal direction Dn and the tangential direction Dt side. Therefore, when an attempt is made to draw the solder portion 16 out in a direction that agrees with the normal direction Dn, or a direction that agrees with the tangential direction Dt, an external force that is applied to the solder portion 16 tends to increase. In contrast, the configuration where the accommodating groove 40 is extended in the direction intersecting with both of the normal direction Dn and the tangential direction Dt can be said to be a configuration that resists an external force that deforms the solder portion 16 when the solder portion 16 is accommodated in the accommodating groove 40.

Figure 5:
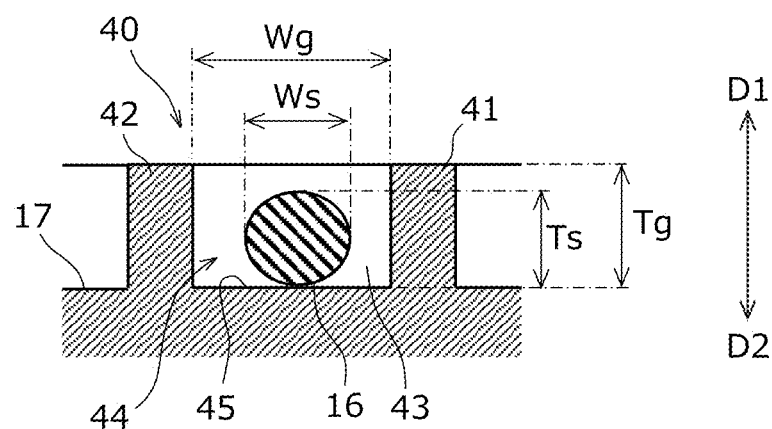
FIG. 5 is a cross-sectional view on arrows B-B of FIG. 3.

Next, a structure for accommodating the solder portion 16 in the accommodating groove 40 is described. FIG. 5 is a cross-sectional view on arrows B-B of FIG. 3.

As illustrated in FIGS. 1, 3, and 5, the accommodating groove 40 includes a space 44 that is delimited by wall surfaces 41, 42, and 43 placed on three sides-two circumferential sides and a radially outer side-relative to the solder portion 16 drawn out to the outer edge portion 17 and accommodated in the accommodating groove 40, and that can accommodate the solder portion 16.

The wall surfaces 41 and 42 are wall portions placed on two circumferential sides of a bottom surface 45 of the accommodating groove 40. The wall surface 43 is a wall portion placed radially outward of the bottom surface 45. Moreover, an upper surface side and a radially inner side of the accommodating groove 40 are provided with no wall portion, and are open. Note that if the wall surfaces 41 and 42 and the wall surface 43 are distinguished below, the wall surfaces 41 and 42 are referred to as the "side walls 41 and 42," and the wall surface 43 is referred to as the "outer wall 43."

In the configuration example illustrated in FIGS. 3 and 5, the side walls 41 and 42 are erected in the first direction D1 on an upper surface of the outer edge portion 17, and are placed apart from and substantially in parallel to each other in the circumferential direction. Moreover, the outer wall 43 is erected in the first direction D1 on the upper surface of the outer edge portion 17. Note that the outer wall 43 of the embodiment is partly formed by an outer peripheral wall 18 protruding on the outer periphery (radially outer circumferential edge) of the outer edge portion 17, but the outer wall 43 is not limited to the configuration that partly shares another part or member, and may be formed by an independent part or member. Moreover, in FIG. 5, the upper surface of the outer edge portion 17 and the bottom surface 45 of the accommodating groove 40 are at substantially the same position in the axial direction, but the former may be located on the first direction D1 side or the second direction D2 side relative to the latter. Note that the widths of the two side walls 41 and 42 are not necessarily the same.

Three dimensions of the accommodating groove 40—a height Tg (depth), a width Wg, and the length Lg in the extending direction Dg—are set to be longer than a height Ts, a width Ws, and the length Ls in the longitudinal direction of the solder portion 16, respectively, in such a manner that the space 44 in which the solder portion 16 can be accommodated can be formed.

The height Tg of the accommodating groove 40 is a dimension in the axial direction, and is a dimension from the bottom surface 45 to upper surfaces of the wall surfaces 41, 42, and 43. Note that in the accommodating groove 40 illustrated in FIG. 5, the side walls 41 and 42 and the outer wall 43 are formed with a common height.

The width Wg of the accommodating groove 40 is a dimension of separation between the side walls 41 and 42 in the circumferential direction. In other words, the width Wg is an interval between opposing surfaces of the side walls 41 and 42, and can also be said to be a dimension (width) of the space 44 in the circumferential direction.

The length Lg (refer to FIG. 3) of the accommodating groove 40 in the extending direction Dg can be said to be a distance from the position 30B of the accommodating groove 40 on the outer periphery 30A to the outer wall 43 (a length linking the position 30B and the outer wall 43 in a straight line). The length Lg is defined by the extending direction Dg of the accommodating groove 40 and the length Ld of the outer edge portion 17 in the radial direction.

The height Ts and the width Ws of the solder portion 16 are equal to, for example, the length of a portion corresponding to the outer diameter when the solder portion 16 is regarded as having an approximately cylindrical shape. In reality, the shape of the solder portion 16 does not necessarily have an approximately cylindrical shape. Therefore, the height Ts of the solder portion 16 can also be said to be an axial dimension when the solder portion 16 is placed on the bottom surface 45. Moreover, the width Ws of the solder portion 16 can also be said to be a circumferential dimension when the solder portion 16 is placed on the bottom surface 45.

The length Ls of the solder portion 16 is equal to the length of a portion corresponding to the height when the solder portion 16 is regarded as having an approximately cylindrical shape. In reality, the shape of the solder portion 16 does not necessarily have an approximately cylindrical shape. Therefore, the length Ls of the solder portion 16 is a length in a direction intersecting with the height Ts and the width Ws, and can also be said to be a dimension along a direction where the windings 35a extend in the solder portion 16. The length Ls of the solder portion 16 is usually greater than the height Ts and the width Ws. Therefore, the length Ls of the solder portion 16 can be said to be a dimension of the solder portion 16 in the longitudinal direction.

In the operation of accommodating the solder portion 16 in the accommodating groove 40, from the viewpoint of preventing an external force that is applied to the solder portion 16, it is preferable that dimensions (the width Wg and the length Lg in particular) of the accommodating groove 40 be set to sizes that have sufficient room for dimensions (the width Ws and the length Ls in particular) of the solder portion 16. If the dimensions of the accommodating groove 40 are less than the dimensions of the solder portion 16, the solder portion 16 may be forcibly pushed in, or the solder portion 16 may be deformed, during the operation of accommodating the solder portion 16 in the accommodating groove 40.

In the accommodating groove 40 of the embodiment, the solder portion 16 drawn out to the outer edge portion 17 is accommodated in the space 44 from the open spot on the upper side and the radially inner side of the accommodating groove 40. The accommodating groove 40 accommodates the solder portion 16 that is not fixed but is simply placed therein. In other words, in the operation of accommodating the solder portion 16, the solder portion 16 is not fixed with, for example, an adhesive or a protrusion in the accommodating groove 40. Put another way, the accommodating groove 40 is not provided with a structure that fixes the accommodated solder portion 16.

Note that a procedure for assembling the above-mentioned housing 11 in FIGS. 1 to 5 is additionally described. When the housing 11 is assembled, the rotor 20 and the stator 30 are placed in the cylindrical portion 11A of the housing 11 first. Next, the conductive wires, such as the winding 35a and the lead 14, or the end wires of the windings 35a, are soldered. Then, the solder portion 16 formed by soldering the end wires of the windings 35a is placed in the accommodating groove 40. Note that the portion where the winding 35a and the lead 14 are soldered is also placed at a predetermined position. The end bell 12 is then assembled with the housing 11 to cover the opening portion 15.

Lastly, the structures of the motor 10 and the blower 1 are described. The motor 10 includes the above-mentioned housing 11, the stator 30 accommodated in the housing 11, and the rotor 20 that is placed, facing the stator 30 in the radial direction. Moreover, the blower 1 of the embodiment is configured, including the motor 10, and the impeller 2 fixed to the shaft 21 (the rotary shaft) of the motor 10.

[2. Effects]

(1) In the above-mentioned housing 11, the accommodating groove 40 is provided in the outer edge portion 17 formed radially outward of the opening portion 15, and the accommodating groove 40 is extended in the any direction Dg between the normal direction Dn and the tangential direction Dt at the position 30B on the outer periphery 30A. Therefore, the solder portion 16 drawn radially outward of the opening portion 15 can be accommodated in the accommodating groove 40 placed in the outer edge portion 17.

The solder portion 16 where the conductive wires including the winding 35a are soldered is accommodated in the accommodating groove 40. Therefore, the deformation of the solder portion 16 can be prevented. Furthermore, it is configured in such a manner that the solder portion 16 is simply accommodated in the accommodating groove 40. Therefore, it is possible to prevent the deformation of the solder portion 16 due to an external force as compared with the known technology in which a neutral connection is fixed using an adhesive or a protrusion. Therefore, the quality of connection can be secured, which in turn can encourage an increase in the quality of the motor 10 and the blower 1.

Moreover, the accommodating groove 40 of the embodiment includes the space 44 delimited by the three wall surfaces 41, 42, and 43, and the solder portion 16 can be accommodated in the space 44. Hence, the solder portion 16 accommodated in the accommodating groove 40 is separated from other members such as the stator 30 and the winding 35a by the wall surfaces 41, 42, and 43. Therefore, the solder portion 16 accommodated in the accommodating groove 40 does not interfere with other members. Therefore, with the configuration including the space 44 as in the embodiment, the deformation of the solder portion 16 can be further prevented.

(2) In the above-mentioned housing 11, the length Ld of the outer edge portion 17 in the radial direction is set to be shorter than the length Ls of the solder portion 16 in the longitudinal direction, and the accommodating groove 40 is extended in the direction intersecting with the normal direction Dn. Hence, the length Lg of the accommodating groove 40 can be formed to be longer than the length Ld of the outer edge portion 17 in the radial direction, and the distance (length) in which the solder portion 16 can be accommodated in the accommodating groove 40 can be set to be longer.

Therefore, even if the length Ls of the solder portion 16 is longer than the length Ld of the outer edge portion 17 in the radial direction, the solder portion 16 can be accommodated in the accommodating groove 40 without bending deformation (a warp) being applied to the solder portion 16. Consequently, it is possible to further prevent the deformation of the solder portion 16 due to an external force and to secure the quality of connection.

Moreover, it is possible to set the length Lg of the accommodating groove 40 to be long and to reduce the length Ld of the outer edge portion 17 in the radial direction. Therefore, it is possible to contribute to downsizing (prevention of upsizing) of the housing 11.

(3) Moreover, in the above-mentioned housing 11, the accommodating groove 40 is extended in the direction intersecting with both of the normal direction Dn and the tangential direction Dt. Hence, the solder portion 16 drawn out to the outer edge portion 17 can be accommodated in the accommodating groove 40 without excessive bending deformation being applied to the solder portion 16. Therefore, it is possible to further prevent the deformation of the solder portion 16 due to an external force and to secure the quality of connection.

(4) Furthermore, in the above-mentioned housing 11, the accommodating groove 40 accommodates the solder portion 16 that is not fixed but is simply placed on the bottom surface 45. Therefore, an external force is less likely to be applied at the time of the operation of accommodating the solder portion 16 in the accommodating groove 40 as compared with the known technology of fixing a neutral connection using an adhesive or a protrusion. Therefore, it is possible to reduce the possibility of the deformation of the solder portion 16 due to an external force and to secure the quality of connection.

(5) According to the motor 10 including the above-mentioned housing 11, at least an effect similar to the effect described of the housing 11 in the above (1) can be obtained. Moreover, the motor 10 including the housing 11 having the configurations described in the above (2) to (4) can also obtain effects similar to the effects described in the above (2) to (4).

(6) Furthermore, according to the blower 1 including the above-mentioned motor 10 and the impeller 2 fixed to the shaft 21 of the motor 10, at least an effect similar to the effect described of the motor 10 in the above (5) can be obtained. Note that the blower 1 is equipped with the motor 10 including the housing 11 having the configurations described in the above (2) to (4), and therefore, the effects similar to the effects described in the above (2) to (4) can also be obtained.

[3. Others]

The housing 11, the motor 10, and the blower 1, which are described above, are examples, and are not limited to the above-mentioned configurations.

For example, the accommodating groove 40 is not limited to the structure having the space 44 delimited by the wall surfaces 41, 42, and 43 erected on the upper surface of the outer edge portion 17, and may have a structure having a space formed by drilling the upper surface of the outer edge portion 17. In this case, wall surfaces placed on three sides-two circumferential sides and a radially outer side—in a space formed by drilling the upper surface of the outer edge portion 17 are the wall surfaces delimiting the space.

Note that in the case body of the blower 1 illustrated in FIGS. 1 and 2, it is desired to reduce the dimension (thickness) in the axial direction. Therefore, the dimension (thickness) of the housing 11 in the axial direction is also reduced. In such a thin housing 11, it is difficult to secure a thickness that allows the outer edge portion 17 to be drilled. Hence, the structure of the above accommodating groove 40 including the space 44 delimited by the erected wall surfaces 41, 42, and 43 is advantageous in a reduction in the thickness of the housing 11 and easy setting of the height Tg that allows the solder portion 16 to be accommodated.

Note that the housing 11 does not necessarily require the space delimited by the wall surfaces placed on the three sides. For example, it may be structured in such a manner that wall surfaces are provided on sides (two directions) of the solder portion 16 to enable preventing the deformation of the solder portion 16.

Moreover, the extending direction Dg of the accommodating groove 40 may be the direction that agrees with the normal direction Dn, or the direction that agrees with the tangential direction Dt.

Moreover, the length Ld of the outer edge portion 17 in the radial direction may be equal to or greater than the length Ls of the solder portion 16 in the longitudinal direction. In this case, even the accommodating groove 40 is structured in such a manner as to be extended in the direction that agrees with the normal direction Dn, the length Lg of the accommodating groove 40 can be set to be equal to or greater than the length Ls of the solder portion 16 in the longitudinal direction.

The solder portion 16 is not limited to the part where the end portions of the windings 35a are soldered, but may be a part where the winding 35a and the lead 14 are soldered, or a part where the leads 14 are soldered.

Moreover, the shape of the housing 11 is not limited to the illustrated shape, but may be, for example, a cylindrical shape without the annular portion 11B illustrated in FIGS. 1 and 2.

Moreover, the type of the motor 10 is not limited to an inner rotor brushless motor, but an application may be made to an outer rotor motor, or an application may be made to a brushed motor.

An application target of the above-mentioned housing 11 including the accommodating groove 40 is not limited to the blower 1, but an application can be made to any device. Examples of a target other than a blower to which the housing 11 including the accommodating groove 40 can be applied include a resin gearbox.

DESCRIPTION OF REFERENCE SIGNS

1 Blower
2 Impeller
10 Motor
11 Blower housing (housing)
11A Cylindrical portion
11B Annular portion
11c Side wall portion
11d Bottom portion
11e Stepped portion
11f Flange portion
12 End Bell
12a Outer peripheral end portion
14 Lead (conductive wire)
14A Groove portion
15 Opening portion
16 Solder portion
17 Outer edge portion
18 Outer peripheral wall
20 Rotor
21 Shaft
22 Magnet
23 Balancer
24 Bearing
25 O-ring
30 Stator
30A Outer periphery
30B Position (circumferential position)
31 Stator core
32 Insulator
35 Coil
35a Winding (conductive wire)
40 Accommodating groove
41, 42 Side wall (wall surface)
43 Outer wall (wall surface)
44 Space
45 Bottom surface
D1 First direction D2 Second direction
Dg Extending direction of the accommodating groove
Dn Normal direction
Dt Tangential direction
Ld Length of the outer edge portion in the radial direction
Lg Length of the accommodating groove
Ls Length of the solder portion (length in the longitudinal direction)
Ra, Rb Angle range

The invention claimed is:

1. A housing that accommodates a stator of a motor, the housing comprising:
    an opening portion configured to accommodate the stator;
    an outer edge portion formed radially outward of the opening portion and in a circumferential direction in such a manner as to surround an outer periphery of the stator, the outer edge portion extending in a radial direction; and
    an accommodating groove configured to accommodate a solder portion where conductive wires including a winding of the stator are soldered and which is drawn out to the outer edge portion, wherein
    the accommodating groove is placed in the outer edge portion, and is extended in any direction between a normal direction to the outer periphery at a circumferential position where the accommodating groove is placed and a tangential direction to the outer periphery at the circumferential position.

2. The housing according to claim 1, wherein
    a length of the outer edge portion in the radial direction is set to be shorter than a length of the solder portion in a longitudinal direction thereof, and
    the accommodating groove is extended in a direction intersecting with the normal direction.

3. The housing according to claim 2, wherein the accommodating groove is extended in a direction intersecting with both of the normal direction and the tangential direction.

4. The housing according to claim 1, wherein the accommodating groove accommodates the solder portion that is not fixed but is simply placed therein.

5. The motor comprising:
    the housing according to claim 1;
    the stator accommodated in the housing; and
    a rotor placed, facing the stator in a radial direction.

6. A blower comprising:
    the motor according to claim 5; and
    an impeller fixed to a rotary shaft of the motor.

* * * * *